No. 722,875. PATENTED MAR. 17, 1903.
P. NAEF.
MEANS FOR COOLING AND LUBRICATING JOURNALS.
APPLICATION FILED JUNE 30, 1900.
NO MODEL.
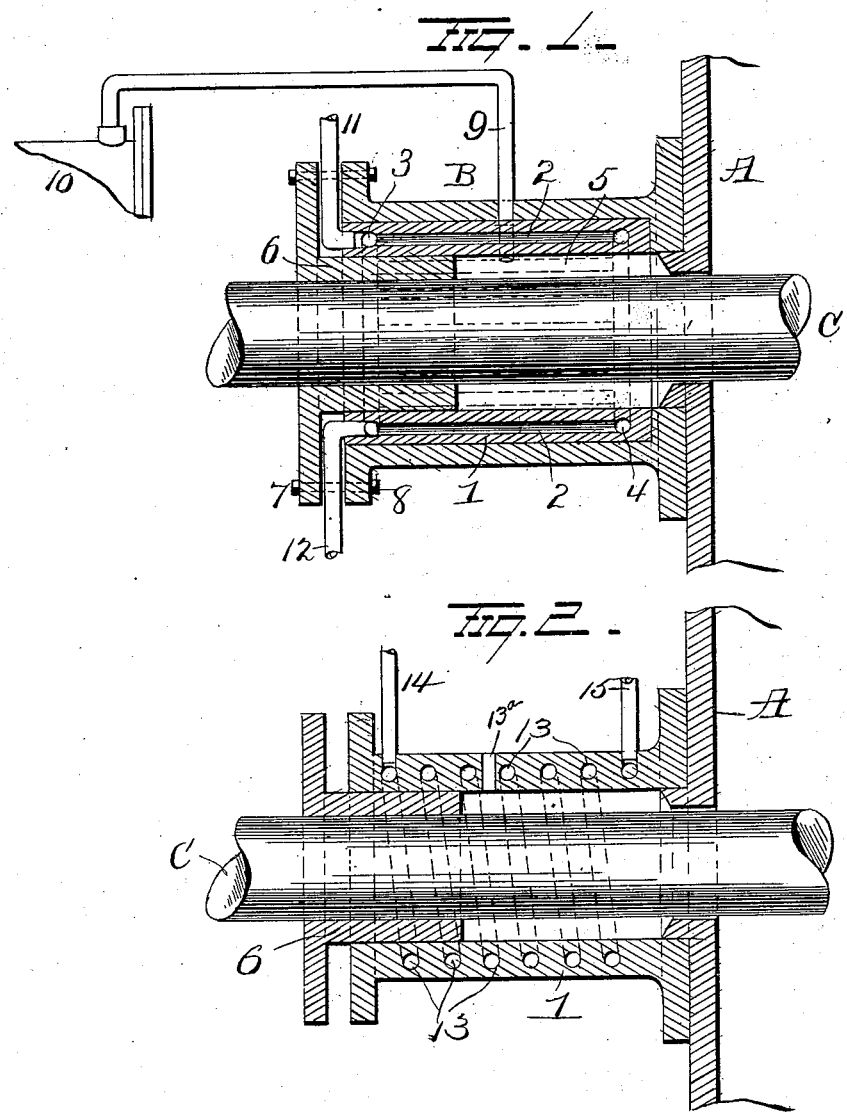
WITNESSES
E. J. Nottingham
G. F. Downing.
INVENTOR
Paul Naef
By H. A. Seymour
Attorney

UNITED STATES PATENT OFFICE.

PAUL NAEF, OF NEW YORK, N. Y.

MEANS FOR COOLING AND LUBRICATING JOURNALS.

SPECIFICATION forming part of Letters Patent No. 722,875, dated March 17, 1903.

Application filed June 30, 1900. Serial No. 22,241. (No model.)

*To all whom it may concern:*

Be it known that I, PAUL NAEF, of New York, in the county of New York and State of New York, have invented certain new and useful Improvements in Means for Cooling and Lubricating Bearings; and I do hereby declare the following to be a full, clear, and exact description of the invention, such as will enable others skilled in the art to which it appertains to make and use the same.

My invention relates to an improvement in means for cooling and lubricating bearings, the object of the invention being to provide means whereby the bearings of piston-rods, shafts, &c., can be kept cool, and thus reduce the frictional resistance between the piston-rod or shaft and its bearings and also result in a saving of lubricating-oil.

With this object in view the invention consists in certain novel features of construction and combinations and arrangements of parts, as hereinafter set forth, and pointed out in the claims.

In the accompanying drawings, Figure 1 is a sectional view showing the application of my improvements to the bearing of a piston-rod. Fig. 2 is a view of a slight modification.

A represents a portion of the head of a cylinder, and B a sleeve or stuffing-box for the piston-rod C. The internal diameter of the sleeve is considerably greater than the diameter of the piston-rod and has fitted within it a hollow sleeve 1, having a number of longitudinal ducts 2, communicating at their respective ends with annular ducts 3 4. The external diameter of the hollow sleeve is preferably such as to cause said hollow sleeve to fit snugly within the sleeve or box B. The sleeve or box B may be omitted and the hollow or channeled sleeve provided at its end with an annular flange secured directly to the cylinder-head, as shown in Fig. 2.

The internal diameter of the hollow or channeled sleeve 1 is appreciably greater than the diameter of the piston-rod, so as to form an annular space or chamber 5 within said sleeve and surrounding the piston-rod. The outer end of this space or chamber is closed by a collar 6, which enters the same and which is provided at its outer end with a flange 7, to be secured to the flange 8 at the outer end of the box or sleeve B.

A pipe 9 communicates with the annular space or chamber 5, and through this pipe lubricant will be forced into said chamber 5 with considerable pressure by means of a pump 10 (or in any other suitable manner) from any convenient source of supply.

An inlet-pipe 11 communicates with the annular duct 3, and an outlet-pipe 12 communicates with the annular duct 4. The inlet-pipe 11 is connected with any suitable source of supply of refrigerating or cooling fluid, and the outlet-pipe 12 may be made to conduct the said fluid back to and through suitable cooling apparatus. The refrigerating fluid will be circulated through the ducts in the sleeve 1, and the temperature of the latter will be kept sufficiently low to congeal the lubricating-oil and cause it to act not only as lubricant for the rod or shaft, but also as a bushing.

In the form of the apparatus shown in Fig. 2 the stuffing-box is omitted, and the sleeve 1, instead of having a series of longitudinal ducts, is provided with a serpentine duct 13 in its wall, through which the refrigerant is circulated, the ends of said duct 13 being provided with inlet and outlet pipes 14 15 for the entrance and exit of the refrigerating fluid. The sleeve 1 is also provided with a duct 13$^a$ for the passage of lubricant into the chamber surrounding the piston-rod, after the manner shown in Fig. 1.

With the use of a lubricant of sufficient consistency and by regulating the temperature of the bearing the use of packing can be entirely avoided, the lubricant taking its place and producing a tight joint. Friction is thus reduced to a minimum. The arrangement shown and described enables me to maintain a temperature in the bearing which may be found to be most advantageous for the various lubricants which could be used. By the use of a suitable lubricant and by cooling to a low temperature the lubricant can be maintained in a semisolid condition in the stuffing-boxes or bearings and running off of the lubricant and escape of gaseous fluid from the cylinder of an engine avoided.

The sleeve surrounding the shaft and containing the channels is often with advantage made in sections, so as to be easily removed.

Each section can have an inlet and outlet for cooling fluid. To keep the sleeve in place, a flange is cast to it or it is held by a plate placed over the end of it.

Having fully described my invention, what I claim as new, and desire to secure by Letters Patent, is—

1. In a bearing, the combination with a rod of a sleeve through which the rod passes, said rod and sleeve being spaced apart to form an annular chamber between them for the reception of lubricant, said sleeve having a series of longitudinal ducts arranged for the circulation of a refrigerant to cool the interior of the sleeve and congeal the lubricant in said annular chamber, said sleeve also having circular ducts communicating with the longitudinal ducts, inlet and outlet pipes for refrigerant communicating with the respective circular ducts, and said sleeve also having a duct for the introduction of refrigerant to said annular chamber.

2. In a bearing, the combination with a rod, of a sleeve surrounding the same and spaced therefrom to form an annular chamber for lubricant, said sleeve having an inclosed duct between the inner and outer faces thereof, whereby a refrigerant can be circulated in the wall of said sleeve in close proximity to the inner wall thereof, and pipes for conducting refrigerant to and from said duct.

3. In a bearing, the combination with a rod, of a sleeve surrounding the same and spaced therefrom to form an annular chamber for lubricant, said sleeve having inclosed ducts in its wall for the circulation of refrigerant close to the inner face of the sleeve, means for conducting refrigerant to and from said inclosed ducts, and means for conveying lubricant to said annular chamber.

In testimony whereof I have signed this specification in the presence of two subscribing witnesses.

PAUL NAEF.

Witnesses:
C. E. LANGDON,
GERRIT SMITH.